July 13, 1948.  W. A. LINTERN ET AL  2,445,275
SAFETY FUEL TANK AND TOOL BOX COMBINATION
Filed Nov. 21, 1946  2 Sheets-Sheet 1

INVENTORS
WILLIAM ALLAN LINTERN &
JOHN N. H. CHRISTMAN JR.
BY
Oberlin & Limbach
ATTORNEYS.

July 13, 1948.　　　W. A. LINTERN ET AL　　　2,445,275
SAFETY FUEL TANK AND TOOL BOX COMBINATION Filed Nov. 21, 1946　　　　　　　　　　　2 Sheets-Sheet 2

INVENTORS
WILLIAM ALLAN LINTERN +
JOHN N. H. CHRISTMAN JR.
BY
Oberlin & Limbach
ATTORNEYS.

Patented July 13, 1948

2,445,275

UNITED STATES PATENT OFFICE 2,445,275

SAFETY FUEL TANK AND TOOLBOX COMBINATION

William Allan Lintern and John N. H. Christman, Jr., Berea, Ohio, assignors to The Lintern Corporation, Berea, Ohio, a corporation of Ohio Application November 21, 1946, Serial No. 711,448

8 Claims. (Cl. 280—5)

1

This invention relates to a combined safety fuel tank and tool box for tractors of the type commonly used in tractor-semi-trailer combinations for highway transportation.

In the present type of highway tractors, the chassis of the tractor is usually very short, being of a length only sufficient to accommodate one of the fifth wheel elements so as to support the front end of the semi-trailer with an overhang of two to three feet forwardly of the fifth wheel element. Thus a space from two to three feet lengthwise of the tractor, about three feet transversely of the tractor chassis, and about eight to ten inches deep above the main channels or side rails of the tractor chassis is provided, this space being in front of the fifth wheel elements and below the overhanging portion of the semi-trailer. Little other space is available on the tractor for accommodating fuel tanks, tools, and the like.

The space above described is disposed forwardly of the rear wheels of the tractor so that any structure in the space can be provided with portions which overhang the side rails laterally of the tractor without interference with the tractor wheels.

A principal object of the present invention is to provide a gasoline tank and tool box combination having common structural components and utilizing fully the space above described.

Another object is to provide a tank and tool box combination in which the box forms the support for a pair of tanks so as to support them in overhanging outboard relation to the rails of the chassis.

Another object is to provide certain safety features in a tank and tool box combination which reduce the risk of fires resulting from overturning of tractor-trailer combinations.

A more specific object is to provide a pair of fuel tanks which are supported at opposite sides of the tractor chassis and connected together so that both tanks can be filled from a single filling spout, yet isolated so that damage to one tank will not cause damage to the other.

Another object is to provide a connection between the tanks which is not likely to be damaged by torsional stresses and vibration.

Other objects and advantages will become apparent from the following description in which reference is made to the drawings, wherein.

Figure 1:
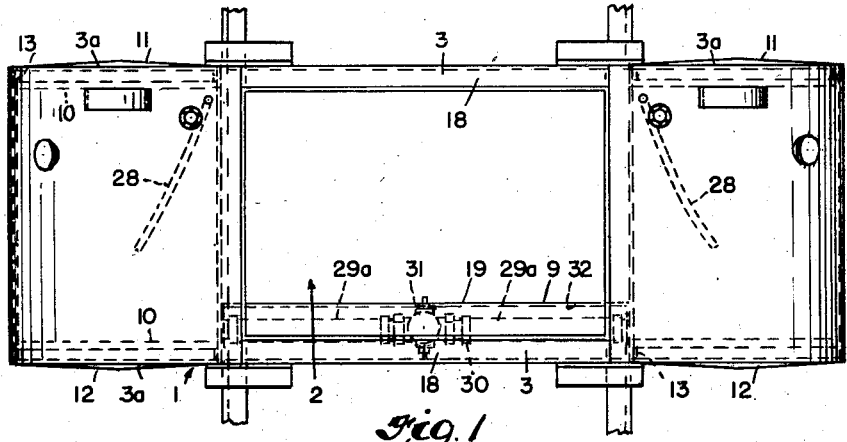
Fig. 1 is a top plan view of a safety fuel tank and tool box combination embodying the principles of the present invention.
Figure 2:
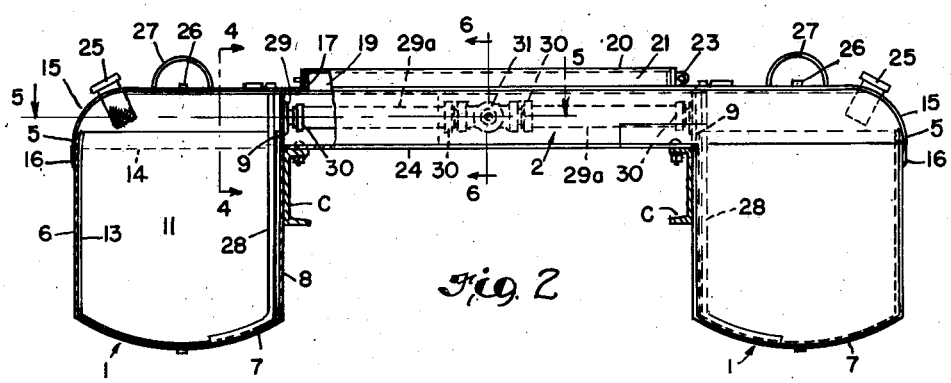
Figs. 2 and 3 are front and right end eleva-
Figure 3:
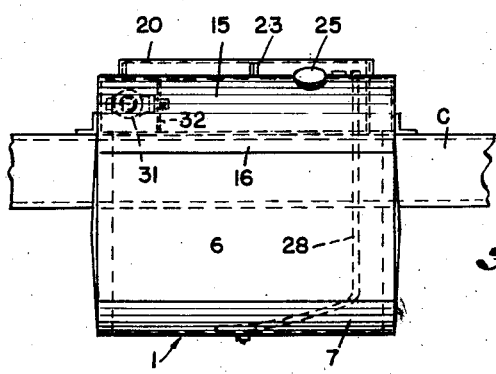
Figure 4:
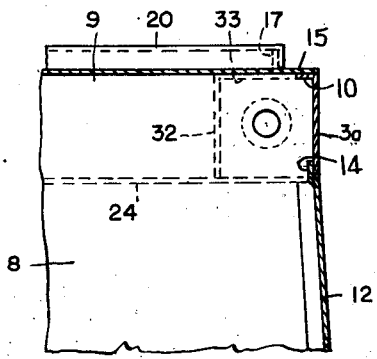
Figure 6:
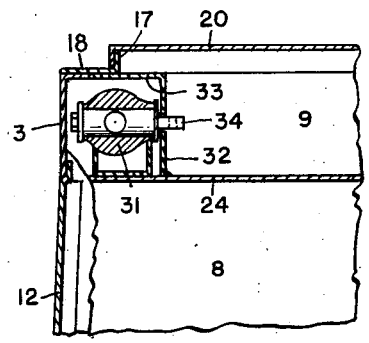
Figure 5:
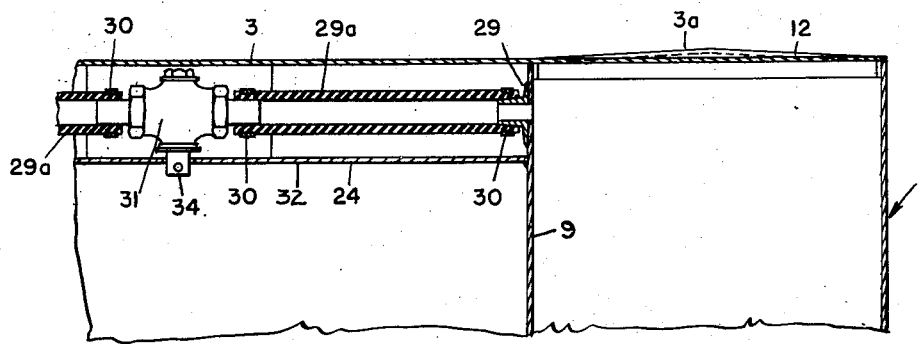
Figure 7:
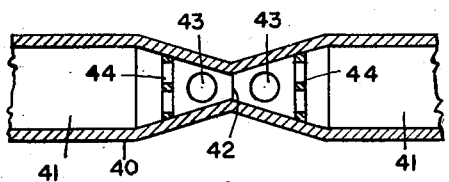

2 tions, respectively, of the fuel tank and tool box combination illustrated in Fig. 1;

Figs. 4, 5 and 6 are fragmentary sectional views of the tank and tool box combination and are taken on lines 4—4, 5—5 and 6—6, respectively, of Fig. 2; and Fig. 7 is an enlarged longitudinal sectional view of a modified form of valve which may be interposed between the tanks.

Referring to the drawings, the combined safety tank and tool kit comprises a pair of duplicate tanks, each of which is indicated generally at 1, and which are arranged to be supported at the outboard sides of the main longitudinal rails C of the chassis of the tractor, respectively. A tool kit 2 is interposed between and rests on the chassis rails C and is of substantially the same length, fore and aft of the vehicle, as the tanks 1.

The tanks 1 and the tool box 2 have certain structural components in common. As best illustrated in Figs. 1 and 2, the tanks and box are formed by providing a pair of transverse cross-members 3 which are spaced fore and aft of the vehicle from each other and extend parallel to each other transversely of the chassis rails C. Each of the cross members 3 has overhanging end portions 3a which extend outwardly laterally of the chassis rails C a distance substantially equal to the overhanging width of the trailer to be used in connection with the tractor.

The side and bottom walls of each tank may be formed of a single strip or plate of sheet metal of which the end margins extend between and are connected at the ends to the outer end portions of the overhanging portions 3a of the members 3, as indicated at 5. The plate extends from its connection downwardly to form plain outboard side walls 6 of the tanks and then is curved inwardly to provide the bottom walls 7 and upwardly to form the inboard side walls 8 which are parallel to the outboard walls 6. The inboard side walls 8 are positioned laterally of the tractor to lie in face-to-face relation to the outboard faces of the main rails C, respectively.

Each plate continues upwardly between the cross members 3, forming a partition wall 9 which is coplanar with the inboard side wall 8 of the associated tank. Since the walls 8 are spaced apart a distance such that they snugly engage the outboard faces of the chassis rails C, they prevent lateral shifting of the tanks relative to the chassis.

The cross members 3 are formed of plate metal and have upright wall portions and top flanges 10, the flanges 10 of one member extending toward the other member. Each tank has a front wall 11 and rear wall 12. Each of the front walls 11 has a peripheral flange 13 extending along both sides and the bottom and arranged for nesting relation with the front margins of the side walls 6 and 8 and bottom wall 7 of the associated tank. The flange 13 terminates at the top at the bottom edge of the portion 3a of the forward cross member 3. The forward wall has an upper marginal portion 14 which extends upwardly beyond the level of the flange 13 and is lap welded to the inner wall of the forward cross member portion 3a. The marginal portion 14 fits between the inner surface of the upper marginal portion of the outboard side wall 6 and the outboard surface of the partition wall 9 and is welded securely to both surfaces.

The rear wall 12 of each tank is the same in all respects as the front wall 11 thereof and is fastened in place in like manner.

The two tanks are identical and accordingly only one of them is described specifically.

A cover plate 15 is provided on each tank and comprises a metal plate which at its outer margin overlaps the wall 6, as indicated at 16, and extends around the ends of the cross members 3 and overlies and engages the top flanges 10 thereof. The plate 15 is welded to the top faces of the flanges 10 and to the wall 6 and the partition wall 9 to provide a liquid-tight joint between the plate 15 and the side wall 6, partition wall 9, and flanges 10.

The plates 15 preferably extend along the top flanges 10 of the members 3 in an inboard direction beyond the partition wall 9 at which point their margins are turned upwardly and form a cover receiving flange 17.

All of the joints between the walls, plates and cross members are welded so that the resultant tank is fluid tight and is rigidly supported by the connection of its forward and rear walls with the members 3 of which the overhanging portions 3a form component parts of the tank and tool box.

Mounted on the top flanges 10 of the cross members 3 between the inboard edges of the cover plates 15 are transverse strips or plates of metal 18 which are welded to the top of the flanges 10 and have their inner margins upturned to provide cover receiving flanges 19 which are continuations of the flanges 17 of the plates 15. The inboard ends of the plates 15 and the strips 18 are welded together and form the top of the tool box. A suitable plate metal cover 20 having a peripheral flange 21 is received on the flanges 17 and 19 with the flange 21 in outwardly embracing relation thereto for closing the top of the box 3. The cover 20 is provided with suitable lugs 22 having holes therethrough for receiving bolts for hingedly securing the cover 20 to the lugs 23 of one of the flanges 17.

The bottom of the box enclosed by the members 3 and the partition walls 9 may be a single plate 24, underlying and welded to the lower edges of the members 3 and welded to the plate forming the walls 8 and 9.

Each tank is provided with the usual gasoline filling spout 25 and with a gas vent 26 protected by a suitable shield 27. Each tank is also provided with a gasoline feed line 28 which opens at the central bottom portion of the tank and extends upwardly through the top 15 for connection to the feed line of the carburetor of the vehicle.

With this arrangement both tanks or either tank can be filled with gasoline directly. However, it is usually desirable that both tanks be filled through the same spout due to convenience in filling at the usual supply stations. Also, it is desirable that the gasoline in each tank be segregated from that in the other and that the connection between the tanks be such that it is not likely to be broken due to warping and twisting of either tank or crystallization due to vibration. For this purpose, the partition wall 9 of each tank is provided with a fitting 29 which is adapted to receive one end of a rubber hose 29a, the hose being generally clamped thereto by the usual clamping band 30. The hoses 29a are connected at their opposite ends to a suitable stop cock 31 which may be operated to place the tanks in communication or to block the flow from one tank to the other as desired. The hoses 29a and stop cock 31 preferably lie in the tool box 2 at the rear end thereof, as illustrated in Fig. 1. In order to protect them from damage by tools, and to isolate them from the box interior, a partition wall 32 is provided which extends between the walls 9 and from the level of the bottom plate 24 to the level of the cover plate 15 and which has an integral top wall 33 which is juxtaposed against the underside of the cover plate 15 and plates 18 as best illustrated in Fig. 6. The partition wall 32 is welded to the plate 24, to the top plates 15 and 18, and to the walls 9 so as to isolate the space between it and upright wall of the adjacent member 3 completely from the interior of the tool box. This not only protects the hoses but reduces the possibility of accumulation of gas within the tool box.

If desired, the stem 34 of the stop cock 31 may extend through the wall 32 into the tool box so as to be readily accessible by a detachable handle, suitable packing being provided in the opening through the wall 32 around the stem 34.

If desired, instead of the valve 32 which must be manually operated, an automatic valve may be used which, in filling the tanks in their normal position, permits the gasoline to flow readily from one to the other but which is operative upon tilting of the tractor to seal off the tank at the high side. Such a valve is illustrated in Fig. 7 and comprises a body 40 having end portions 41 at the ends for connection to the hoses, such as the hoses 29a. The body tapers inwardly from both ends to a central port 42 and suitable balls 43 are accommodated in the body at each side of the port 42. The balls 43 are relatively heavy and are arranged to roll down into seating engagement with suitable seating areas on the side walls of the body 40 so as to close the port 42, depending upon which one of the balls is at the high side when the tractor and valve is tilted. These are operative, of course, only if the tilt of the tanks about an axis longitudinally of the vehicle exceeds a predetermined amount which is determined by the slope of the inner walls of the valve body 40 between the port 42 and the end portions 41. Suitable spiders 44 are arranged in the valve body so as to constrain the balls 43 to a position in proximity to the seat 42.

It is apparent from the foregoing description that all of the limited space heretofore described is used to full advantage in the present structure and that the tanks may be isolated from each other at all times yet connected for purposes of filling both from the same spout. Furthermore, torsional stresses on one tank are not transmitted to the other in such a manner as to break the fittings or connection therebetween due to the flexible hoses and each tank is securely anchored by the welded connection between its front and rear walls and the upright wall portions of the rear walls and the upright wall portions of the

Having thus described our invention, we claim:

1. A safety fuel tank combination for highway tractors and comprising front and rear rigid cross members adapted to overlie but be supported by the longitudinal rails of a tractor chassis and to extend therebeyond laterally of the chassis, a pair of fuel tanks, each tank being connected to both of said cross members in a position to be supported thereby with a portion depending therefrom, one tank at each side of the chassis, the cross members forming the upper part of front and rear walls respectively of each tank, laterally spaced inboard partition walls extending between the cross members adjacent the planes of the inboard side walls of the tanks respectively and forming the upper portions of the inboard side walls, means closing the bottom of the space enclosed by the cross members and inboard partition walls, and providing therewith a tool box, top wall means secured to the cross members and forming a top on said box with an opening therein affording access to the interior of the box and a cover for opening and closing said opening.

2. A safety fuel tank combination for highway tractors and comprising front and rear rigid cross members adapted to overlie but supported by the longitudinal rails of a tractor chassis and to extend therebeyond laterally of the chassis, a pair of fuel tanks, each tank being connected to both of said cross members in a position to be supported thereby with a portion depending therefrom, one tank at each side of the chassis, the cross members forming the upper part of front and rear walls respectively of each tank, laterally spaced inboard partition walls extending between the cross members adjacent the planes of the inboard side walls of the tanks respectively and forming the upper portions of the inboard side walls, means closing the bottom of the space enclosed by the cross members and inboard partition walls, and providing therewith a tool box, top wall means secured to the cross members and forming a top on said box with an opening therein, a conduit in said box and connecting said tanks through said partition walls.

3. A safety fuel tank combination for highway tractors and comprising front and rear rigid cross members adapted to overlie but supported by the longitudinal rails of a tractor chassis and to extend therebeyond laterally of the chassis, a pair of fuel tanks, each tank being connected to both of said cross members in a position to be supported thereby with a portion depending therefrom, one tank at each side of the chassis, the cross members forming the upper part of front and rear walls respectively of each tank, laterally spaced inboard partition walls extending between the cross members adjacent the planes of the inboard side walls of the tanks respectively and forming the upper portions of the inboard side walls, means closing the bottom of the space enclosed by the cross members and inboard partition walls, and providing therewith a tool box, top wall means secured to the cross members and forming a top on said box with an opening therein, a conduit in said box and connecting said tanks through said partition walls, and a partition wall in the receptacle extending generally parallel to and spaced from one of the cross members, and isolating from the remainder of the box that portion of the box in which the conduit is located.

4. A fuel tank and tool box combination for a highway tractor having a chassis with longitudinal rails and comprising rigid front and rear cross members adapted to be supported by the chassis rails and each having an upright wall portion and being of such length as to extend entirely across the chassis and beyond the outboard sides of the rails, a pair of tanks carried by the outboard portions of the cross members and positioned to lie at the outboard sides of the rails when the cross members are supported on the rails, each tank having front and rear walls secured in lapped relation at their upper margins to the upright walls of the front and rear cross members, respectively, said tanks having inboard walls adapted to lie along the outboard faces of said rails, respectively, a bottom plate closing the bottom of the space between the cross members inwardly from the inboard side walls of the tanks, the inboard side walls extending upwardly between the cross members and being sealed to the upright wall portions thereof and forming partition walls, isolating said space from the interior of the tanks, cover plates for the tanks sealed to the outboard side walls thereof and to the cross members and partition walls, a top wall for said space and secured to the cross members, said top having an opening therein affording access to the space, and a removable cover for the top wall.

5. A fuel tank and tool box combination for a highway tractor having a chassis with longitudinal rails and comprising rigid front and rear cross members adapted to be supported by the chassis rails and each having an upright wall portion and being of such length as to extend entirely across the chassis and beyond the outboard sides of the rails, a pair of tanks carried by the outboard portions of the cross members and positioned to lie at the outboard sides of the rails when the cross members are supported on the rails, each tank having front and rear walls secured in lapped relation at their upper margins to the upright walls of the front and rear cross members, respectively, said tanks having inboard walls adapted to lie along the outboard faces of said rails, respectively, a bottom plate closing the bottom of the space between the cross members inwardly from the inboard side walls of the tanks, the inboard side walls extending upwardly between the cross members and being sealed to the upright wall portions thereof and forming partition walls, isolating said space from the interior of the tanks, cover plates for the tanks sealed to the outboard side walls thereof and to the cross members and partition walls, a top wall for said space and secured to the cross members, said top having an opening therein affording access to the space, and a removable cover for the top wall, a flexible conduit connecting the tanks through said partition walls and enclosed in said space.

6. A combination tool box and fuel tank for highway tractors having a chassis with longitudinal side rails and comprising a rigid metal box having front and rear walls adapted to extend transversely of the chassis and side walls connected in sealed relation to the front and rear walls and a bottom wall connected to all of said walls, said box being adapted to be supported on said rails, said front and rear walls each extending at each side of the box outwardly beyond the side walls of the box a sufficient distance to overhang said rails, means for closing the top of the box, fuel tanks at opposite sides of the box and uncommunicated therewith, each tank having depending front and rear walls connected at their upper ends to the overhanging portions of the front and rear walls of the box, respectively, the overhanging portions of the said cross members and the side walls of the box forming the upper portions of the walls of the tanks, and cover walls carried by and sealed to the cross members and side walls and to the outboard side walls of the tanks, respectively, and closing the top of the tanks.

7. A fuel tank and tool box combination for highway tractors having a chassis with longitudinal side rails and comprising front and rear rigid cross members adapted to overlie the longitudinal side rails of the tractor chassis and extend laterally of the chassis beyond the rails, a pair of tanks, each of which is carried by both cross members, said tanks being positioned to be supported by the cross members, one at each outboard side of the chassis rails, each tank having an outboard side wall connected at its upper margin to the cross members, a bottom wall, and an inboard side wall extending upwardly between the cross members and secured thereto, to form a partition wall therebetween, and each tank having front and rear walls each in the form of a metal plate having peripheral margins interfitting against the inner faces of the inboard, outboard, and bottom walls of the tank and welded thereto in lapping relation for supporting the tanks, a cover plate for each tank welded to the outboard side wall thereof and extending over the end and along the top of the cross members and the upper edge of the inboard side wall and welded to said cross members and inboard side wall, a bottom plate secured to the cross members and closing the bottom of the space enclosed by the cross members and partition walls to provide a tool box.

8. A safety fuel tank combination comprising a pair of fuel tanks, means adapted to be supported on the longitudinal rails of a highway tractor chassis and connected to the tanks for supporting the same in a position to lie one tank at each side of the chassis, one of said tanks having a filling spout, a conduit connecting said tanks together, said conduit extending transversely between the tanks and between the upper and lower limits of said means, an automatic valve between the ends of the conduit and normally open to permit the flow of fuel through the conduit from one tank to the other and operating upon tilting of the tanks as a unit about an axis extending longitudinally of the chassis to block the flow of fuel from the higher of the tanks to the lower.

WILLIAM ALLAN LINTERN.
JOHN N. H. CHRISTMAN, JR.

REFERENCES CITED

The following references are of record in the file of this patent:

UNITED STATES PATENTS

| Number | Name | Date |
| --- | --- | --- |
| 1,727,207 | Kramer | Sept. 3, 1929 |
| 2,111,563 | Kliesrath | Mar. 22, 1938 |
| 2,181,772 | Snyder | Nov. 28, 1939 |
| 2,276,963 | Griffin | Mar. 17, 1942 |
| 2,314,298 | Welch | Mar. 16, 1943 |